United States Patent
Jobs et al.

(10) Patent No.: US 6,957,395 B1
(45) Date of Patent: Oct. 18, 2005

(54) COMPUTER INTERFACE HAVING A SINGLE WINDOW MODE OF OPERATION

(75) Inventors: Steven P. Jobs, Palo Alto, CA (US); Donald J. Lindsay, Mountain View, CA (US)

(73) Assignee: Apple Computer, Inc., Cupertino, CA (US)

(*) Notice: Subject to any disclaimer, the term of this patent is extended or adjusted under 35 U.S.C. 154(b) by 516 days.

(21) Appl. No.: 09/477,419

(22) Filed: Jan. 4, 2000

(51) Int. Cl.[7] ................................................. G06F 9/00
(52) U.S. Cl. ................. 715/765; 715/779; 715/759; 715/760; 715/700; 715/838; 715/843
(58) Field of Search .................................. 345/742, 752, 345/759, 760, 762, 765–767, 775, 778, 779, 783, 789, 797, 803, 804, 805–810, 838, 891, 843, 835, 840, 856, 859, 861, 862, 977

(56) References Cited

U.S. PATENT DOCUMENTS

| | | | | |
|---|---|---|---|---|
| 4,974,174 A | * | 11/1990 | Kleinman | 345/662 |
| 5,333,256 A | * | 7/1994 | Green et al. | 345/772 |
| 5,736,974 A | * | 4/1998 | Selker | 345/860 |
| 5,943,039 A | * | 8/1999 | Anderson et al. | 345/810 |
| 5,973,694 A | * | 10/1999 | Steele et al. | 345/835 |
| 6,002,398 A | * | 12/1999 | Wilson | 345/777 |
| 6,043,816 A | * | 3/2000 | Williams et al. | 345/783 |
| 6,310,633 B1 | * | 10/2001 | Graham | 345/835 |
| 6,333,752 B1 | * | 12/2001 | Hasegawa et al. | 345/581 |

* cited by examiner

*Primary Examiner*—Kristine Kincaid
*Assistant Examiner*—Peng Ke
(74) *Attorney, Agent, or Firm*—Buchanan Ingersoll PC

(57) ABSTRACT

A computer-human interface manages the available space of a computer display in a manner which reduces clutter and confusion caused by multiple open windows. The interface includes a user-selectable mode of operation in which only those windows associated with the currently active task are displayed on the computer monitor. All other windows relating to non-active tasks are minimized by reducing them in size or replacing them with a representative symbol, such as an icon, so that they occupy a minimal amount of space on the monitor's screen. When a user switches from the current task to a new task, by selecting a minimized window, the windows associated with the current task are automatically minimized as the window pertaining to the new task is displayed at its normal size. As a result, the user is only presented with the window that relates to the current task of interest, and clutter provided by non-active tasks is removed.

39 Claims, 4 Drawing Sheets

COMPUTER INTERFACE HAVING A SINGLE WINDOW MODE OF OPERATION

FIELD OF THE INVENTION

The present invention is generally directed to operating systems for computers, and more particularly to a computer-human interface that manages the amount of information presented at one time to a user by removing non-active windows from view.

BACKGROUND OF THE INVENTION

The increased processing power that becomes available with each new generation of personal computers provides users with greater opportunities to accomplish a variety of different tasks. Users are no longer confined to performing a single task at a time on their personal computers. Rather, multitasking has become a common manner of operating a computer for many users. Such multitasking may occur within a single application program, e.g., a user might have several documents open within a word processing or graphics program, and/or across multiple applications. For instance, the user could open a web browser to access one or more web sites on the Internet, while at the same time running an electronic mail program to read messages and a word processing program to paste the content of the messages or web sites into one or more documents.

In graphical user interfaces which employ windows to present data to users, each task that is being performed by the user may have one or more windows associated with it. For example, each document that is open in a word processing program will have its contents displayed in a separate window. In addition, various functions performed by the program, such as spell checking, print spooling and the like may each have one or more secondary windows associated with them, to provide status information and/or user input. Similarly, every other application program that is running on the computer presents one or more windows to the user. For instance, if a browser is employed to access a number of different types of web sites, e.g., an http site, an ftp site and a news site, the contents of each site might be respectively presented in three different windows.

It can be appreciated that, as multiple tasks are performed on the computer at one time, the number of windows that are simultaneously displayed can become significant. For the inexperienced user, multiple open windows can be a source of frustration or confusion. For instance, a window of interest may become completely overlaid by other, later-accessed windows, thereby blocking it from view. The user may not know how to navigate to the desired window without closing all of the windows that overlie it, which may not be consistent with the operation intended by the user. Even for the more experienced user, a large number of open windows may present a cluttered interface which detracts from the overall computing experience.

SUMMARY OF THE INVENTION

It is an objective of the present invention, therefore, to provide a computer-human interface which includes a mechanism to manage the available space of a computer display in a manner that reduces clutter and confusion caused by multiple open windows. In accordance with the invention, this objective is accomplished by means of a user-selectable mode of operation in which only a single window, or at most a few windows, associated with the currently active task is displayed on the computer monitor. All other windows relating to non-active tasks are minimized by reducing them in size or replacing them with a representative symbol, such as an icon or a menu item, so that they occupy a minimal amount of space on the display screen. When a user switches from the current task to a new task, for example by selecting a minimized window, the window associated with the current task is automatically minimized as the window pertaining to the new task is returned to an enlarged state. As a result, the user is only presented with the window that relates to the current task of interest, and clutter provided by nonactive tasks is removed.

In an exemplary embodiment of the invention, every task window displayed on the display screen includes a control element, such as a button, that can be used to toggle the single window mode of operation on and off. When the mode is toggled on, it affects all windows that are displayed on the monitor, so that only a single task window is displayed. If desired, however, the mode of operation can be selectively disabled on a per-window basis, to permit two or more windows to be displayed simultaneously, for instance to permit content in one window to be dragged to a specific location in the other window.

Since only one window of interest is presented to the user while the single window mode of operation is in effect, the open window is preferably located at a central position on the display screen. In a preferred embodiment, the window is horizontally centered, at a known offset from the top of the available screen area. If the user repositions the window during this mode, the new position becomes the stored position for the window when the single window mode is subsequently disabled.

Further features and advantages of the invention will become apparent from the following description of a preferred embodiment of the invention illustrated in the accompanying drawings.

DETAILED DESCRIPTION

To facilitate an understanding of the present invention, it is described hereinafter with reference to a particular embodiment illustrated in the accompanying drawings. It will be appreciated, however, that the principles which underlie the present invention are not limited to this particular embodiment. For example, various features of the invention are occasionally described in the context of their implementation in the user interface associated with the Macintosh® Operating System (Mac OS®) provided by Apple Computer, Inc. These features are equally applicable to other types of graphical user interfaces. Consequently, specific aspects of the implementation that are described hereinafter should not be viewed as any limitation on the applicability of the invention to a variety of different types of computer-human interfaces.

Figure 1:
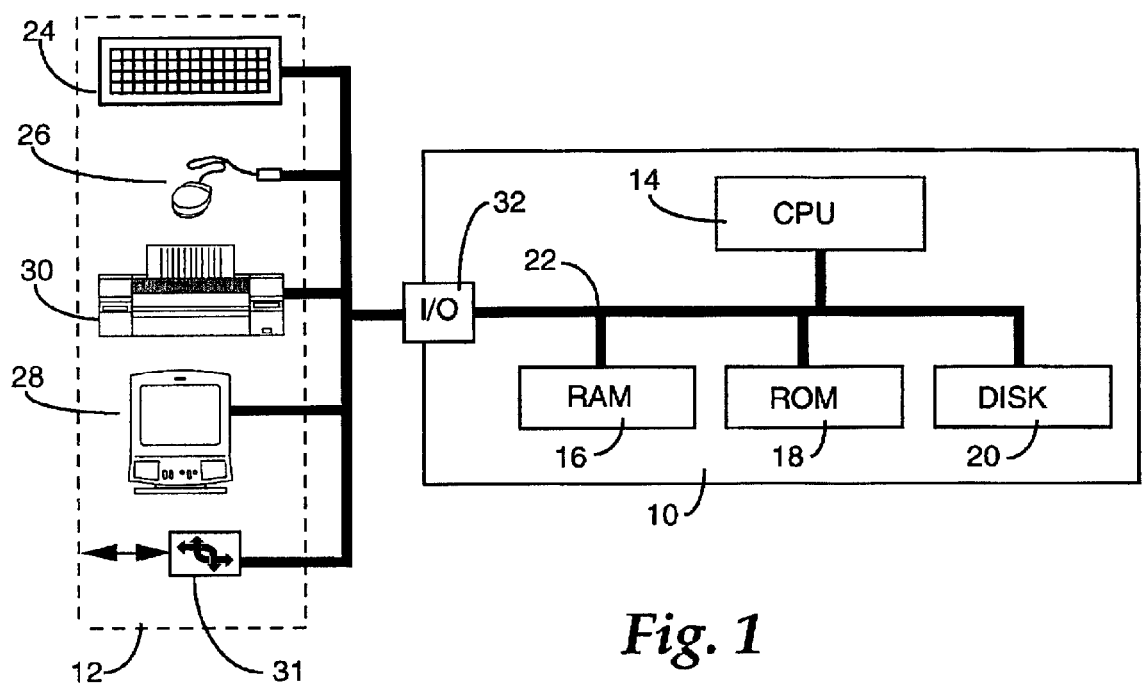
FIG. 1 is a block diagram of an exemplary computer system in which the present invention can be implemented.

The present invention is directed to the management of windows that are displayed as part of the user interface in a computer system. While the particular hardware components of a computer system do not form a part of the invention itself, they are briefly described herein to provide a thorough understanding of the manner in which the features of the invention cooperate with the components of a computer system to produce the desired results. Referring to FIG. 1, an exemplary computer system includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read-only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26, such as a mouse, trackball, pen or the like. One or more display devices 28, such as a CRT monitor or an LCD screen, provide a visual display of information, including the various components of the graphical user interface. Hard copies of desired information can be provided through a printer 30, or similar such device. A network connection 31 provides the computer with access to one or more servers, which may function as gateways, file storage systems, messaging systems, and the like. Each of these external peripheral devices 12 communicates with the CPU 14 by means of one or more input/output ports 32 on the computer.

A significant component of a user's experience in operating a computer is the user interface, i.e., the manner in which the computer presents information to the user via the display device 28. In an effort to make the computing experience as friendly and intuitive to the user as possible, many computer systems employ a graphical user interface. The graphical user interface may constitute an element of the computer's operating system, as in the case of the Mac OS® and the Windows® operating system provided by Microsoft Corporation. In other cases, the graphical user interface may comprise a separate program that interacts with the operating system.

Figure 2:
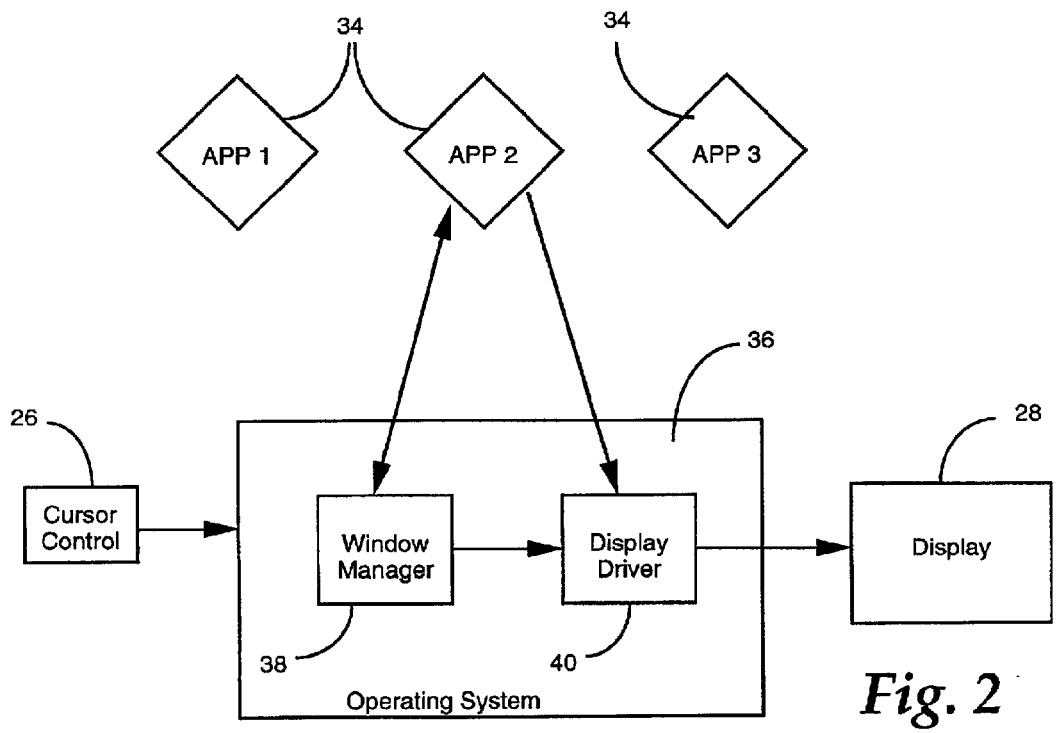
FIG. 2 is a block diagram of the relationship of software components running on the computer system.

One of the fundamental components of most graphical user interfaces is the window. In essence, a window functions as a container for a particular type of data that is to be presented to the user, such as the text in a word processing document, graphical images in a drawing document, and the content of an Internet web page. Each different application program that is being executed on the computer presents its associated data within a separate window. For instance, FIG. 2 illustrates an example in which three application programs 34, such as a word processing program, a web browsing program and an electronic mail program, are all running simultaneously on the computer. Whenever one of these programs has data to display to the user, it sends a request to the computer's operating system 36, requesting a window for the presentation of the data. This request is provided to a window manager 38, which sends instructions to a display driver 40 to create the structure of the window on the display 28, and informs the application program of the area within which its data can be displayed.

If all three application programs are running concurrently on the computer, three different windows that are respectively associated with the three programs may be displayed. At any given time, one of these windows is the active window, namely the window which pertains to the current task and receives user input from the keyboard 24 and the cursor control device 26. If the user clicks in one of the other windows to perform a new task, it becomes the active window and the previously active window becomes non-active. The window manager is responsive to the action of the cursor control device 26 to cause the displays of the active and non-active windows to be changed accordingly, for example by dimming features of non-active windows or removing color from their components, and bringing the active window to the forefront of the display. In addition, the window manager is responsive to other user actions to store data for each window. Thus, if the user repositions or resizes a window, that information is stored so that the next time the window is opened, it appears at the size and position last set by the user.

Figure 3:
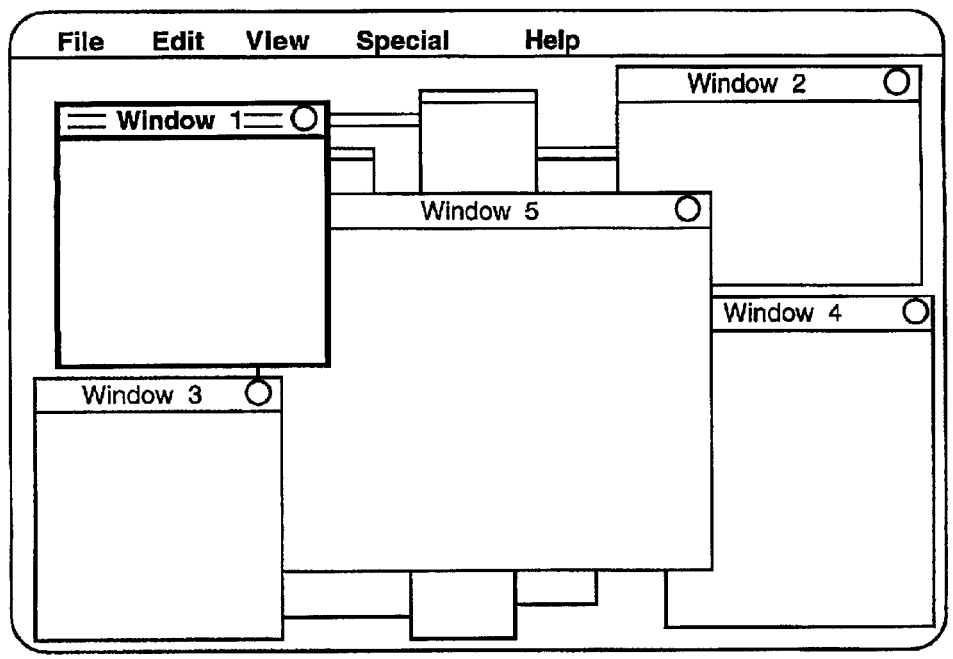
FIG. 3 is an illustration of a display having multiple open windows.

It is also possible to open several windows under the control of a single application program. For example, if the user is working with multiple documents in a word processing program, each document is displayed in a separate window. Furthermore, different portions of the same document can be displayed in different respective windows. Consequently, it is conceivable that a significant number of windows can be opened on the computer's display 28, particularly for users who perform a number of different tasks on their computers. FIG. 3 illustrates an example of a computer display containing a variety of windows, which may result from all of the tasks that are performed during a typical day of operating the computer.

While the ability to have multiple windows simultaneously open on the computer display is advantageous, since it provides the user with instantaneous access to the information associated with a number of different tasks, in some situations such a display may not be desirable. For instance, in the case of a relatively inexperienced user, multiple open windows may inhibit the user's ability to navigate to a particular item of information that is desired. More specifically, as each new window is opened, it appears in the foreground of the display, and may overlap or completely obscure other windows. Similarly, when a previously opened window is accessed and made active, it is brought to the foreground, and may also overlay or obscure other windows. As a result, the least recently accessed window will appear to be "behind" all of the other windows, making it difficult for the user to find.

Of course, the user can locate a window by closing all of the other windows that are displayed on top of it. However, such an action may be contrary to the user's intentions, since the closing of a window may effectively terminate the task associated with the information in that window. If the task has not yet been completed, the user may not want to close the window.

Even in the case of more experienced users, a large number of open windows can result in a "cluttered" appearance to the display, which detracts from the task of current interest. Hence, even if the user is able to readily navigate among multiple open windows, it may be desirable to reduce the amount of space on the display which is occupied by windows that do not relate to the current task.

In accordance with the present invention, these concerns associated with a proliferation of windows are addressed by means of a user interface that provides a "single window" mode of operation. In essence, the single window mode of operation reduces user interface clutter by automatically minimizing all non-active windows of applications being executed, thereby leaving a single active task window on the display at any given time. A minimized window is a proxy representation of the original window and occupies a minimal amount of space, or in some cases no space, on the display. When the user selects a minimized window to view its contents, it is restored to its former size, and the previously active window on the display is minimized.

It is to be noted that, in the context of the present invention, the term "single window," as applied to the mode of operation described herein, should not be construed to mean that only one window is visible at all times during which the mode is in effect. For example, windows may be divided into different categories, such as primary and secondary. Primary windows can be those windows in which the main activity of a task or application occurs, such as creation and editing of text, viewing a web page, etc. Secondary windows might be associated with information or utilities that support the main activity. Examples of secondary windows include dialog boxes that provide for user input upon saving or printing documents, tool palettes, spelling checkers, alert messages, splash screens, and the like. In such a context, the term "single window" refers to the behavior of the primary windows, which are identified hereinafter as "task windows." Secondary windows that belong to the currently active application program can also be displayed along with the task windows to which they pertain.

Figure 4:
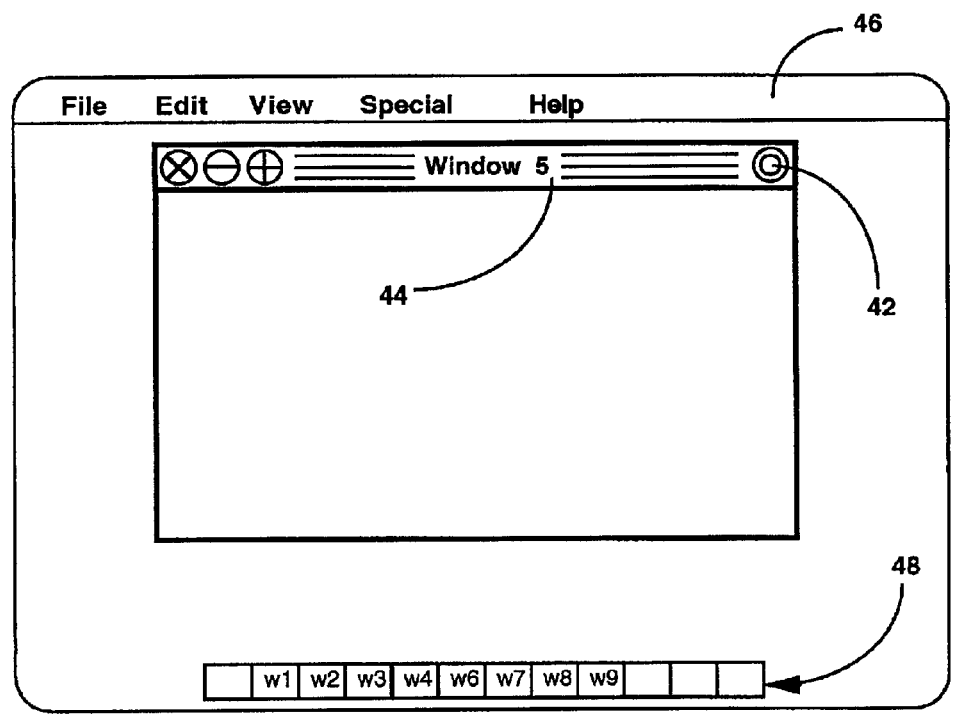
FIG. 4 is an illustration of the user interface in the single window mode of operation.

The single window mode of operation is selectable by the user. Referring to FIG. 4, in an exemplary embodiment of the invention, every task window can include, as part of its standard structure, a control element by which the user can toggle the single window mode of operation on and off. For example, the control element can be a button 42 which is located on the title bar 44 of the window. The button can have different states, e.g. be displayed with different colors, to indicate whether the single window mode is enabled or disabled. As an alternative to a control element on each task window, the toggle switch for the single window mode could appear as a button on a system menu bar 46, or as a menu item on the main menu for the system. For example, the user could selectively enable or disable the single window mode by means of a command within the "View" menu on the main menu bar 46. If the single window mode is enabled by means of a control element on a window, it is preferable that it be accessible on non-active task windows as well as the active task window. Thus, in the example of FIG. 3, a control button is available on each of non-active windows 2–5, as well as the active Window 1. If the user clicks on the button 42 in a non-active window, that window becomes active and all other windows are minimized.

When the single window mode of operation is selected, it functions as a system-wide preference that affects all applications running on the computer and their respective windows. When the control element 42 is activated to enable the single window mode, the window manager automatically minimizes all non-active windows of all applications, thereby leaving a single active task window visible on the display. Hence, when the user activates the button on "Window 5" in FIG. 3 to enable the single window mode of operation, the display goes from the state illustrated in FIG. 3 to that of FIG. 4.

The minimization of all non-active windows can take a variety of forms. In an exemplary embodiment of the invention, a minimized window is depicted as a thumbnail representation of the window. In essence, a thumbnail representation is a reduced-scale image of the window. The thumbnail image can include the structure of the window, or merely its content. As an alternative to using a thumbnail, a proxy such as a predefined icon image can be used to represent the minimized window. For example, the minimized representation of a folder might be shown as a folder icon, rather than a thumbnail of the window's content. As another alternative, a minimized window might be represented by a small title bar. In general, the minimized representation can be any form of image or data that occupies a small area on the display and provides the user with some indication of the nature of the window it represents.

Figure 5:
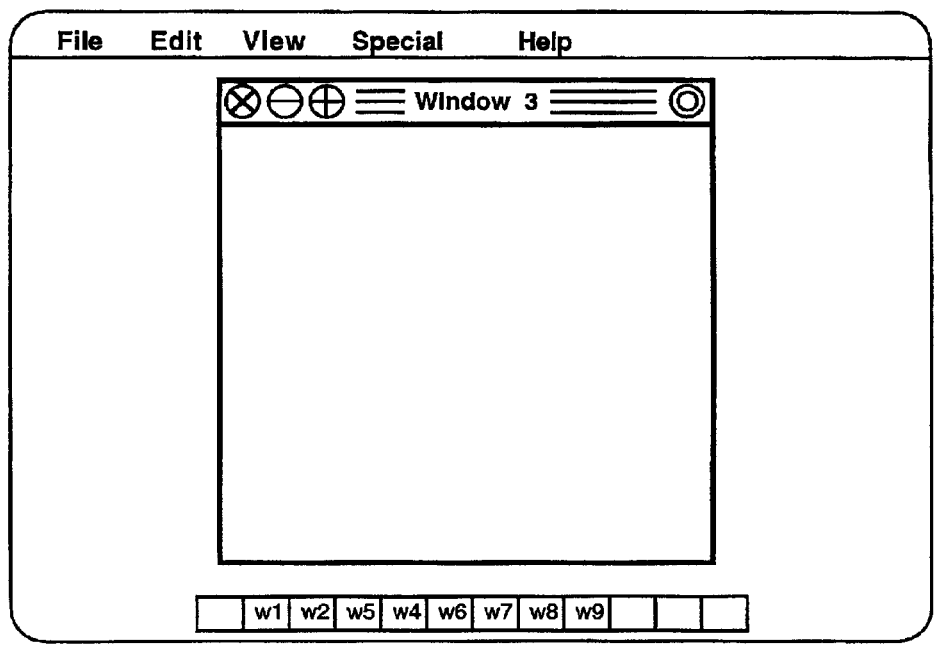
FIG. 5 is another example of a window in the single window mode of operation.

The minimized representations of the non-active windows can be displayed at any desired location on the display screen. Preferably, each minimized representation is displayed in a docking area which manages the positions of the minimized representations. In an exemplary embodiment of the invention, the docking area is comprised of a user bar, of the type described in greater detail in U.S. application Ser. No. 09/467,074, filed Dec. 20, 1999, and entitled "User Interface for Providing Consolidation and Access." Referring to FIG. 4, the user bar 48 comprises a series of tiles that can represent application programs, documents, uniform resource locators, and the like. In the context of the present invention, a minimized window's representation, e.g., its thumbnail, appears as a tile on the user bar. For illustrative purposes, in the example of FIG. 4 the minimized windows are designated as W1, W2, W3, etc. When the user clicks on a tile of the user bar that represents a minimized window, the window is restored to its original size, and the previously active window is simultaneously minimized. Thus, if the user clicks on the tile W3, Window 3 is restored to its normal view to become the active window, and Window 5 is minimized, as illustrated in the transition from FIG. 4 to FIG. 5. If the user selects a minimized window that results in a switch of applications, all secondary windows belonging to the previously active application, whose active task window is being minimized, can be hidden, and secondary windows associated with the new application can be redisplayed along with the restored active window.

Other types of docking areas can be employed as alternatives. Examples of such include a task bar, a user-positionable palette, or a menu. Further, the docking area can be displayed anywhere on the screen, preferably oriented along one edge thereof.

In some cases, it may not be desirable to provide a separate image in the docking area to represent each minimized window. For example, if a number of task windows are open within the context of a single application, and that application is represented by a tile on the user bar, the individual windows can be represented as separate entries in a sub-menu associated with the application's tile. In this case, when the user positions a cursor over the tile, a pop-up menu can be displayed, which lists each of the minimized windows associated with that application, for example by the titles appearing in their respective title bars. The user can then select any individual window by clicking on it within the menu, which restores it to its original size, and causes the previously active window to be minimized. Hence, the representation of a minimized window does not need to be continuously displayed. Rather, it can be hidden in a manner that enables it to be selectively presented to the user, to thereby further reduce the amount of space occupied by elements associated with inactive tasks.

Figure 6:
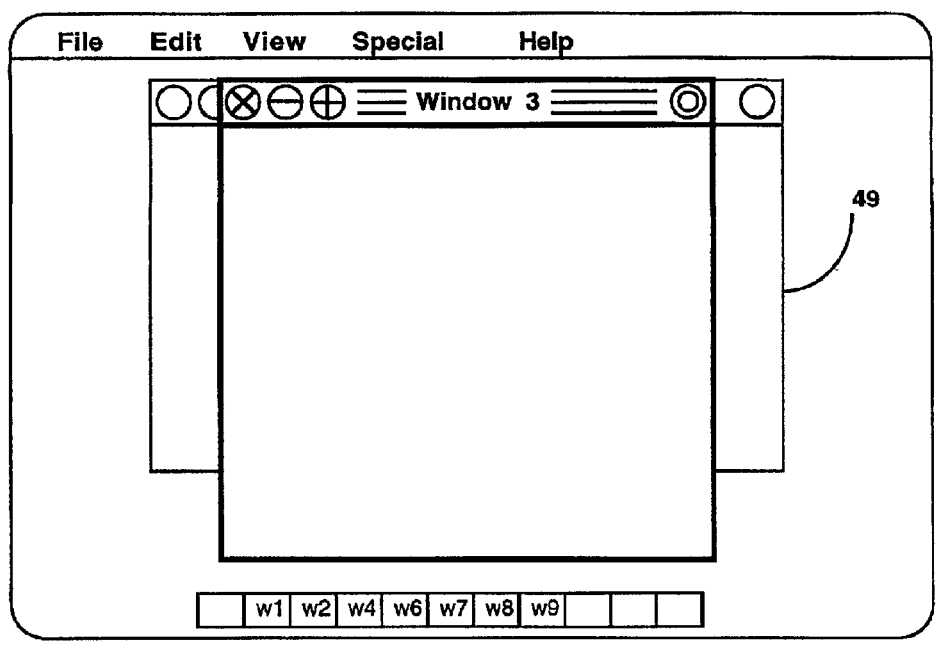
FIG. 6 illustrates an example of an overridden single window mode display.

In certain situations, the user may desire to have more than one task window displayed, without disabling the single window mode of operation. For example, the user may desire to select contents from a document displayed in one window, and drag them into another document appearing in a separate window. In this case, it is preferable to have both windows displayed. In the context of the invention, the single window mode can be temporarily overridden on an individual window basis. This can be accomplished when one task window is displayed, for example, by performing a modified operation to select a new window for display. For instance, in the embodiment described above, the user can switch from Window 5 to Window 3 by clicking on the W3 representation in the user bar. In the normal mode of operation depicted in FIGS. 4 and 5, Window 3 is displayed as the active window, and Window 5 is minimized. However, by performing a modified operation, for instance by holding down one of the Shift, Control or Option keys while clicking on the minimized window representation, the selected window is opened as the new active window, but the previously active window is not minimized. Rather, as illustrated in FIG. 6, it remains on the display as a non-active window 49. Additional windows can be displayed by performing the modified selection in the same manner. If a minimized window is thereafter selected without a modified operation, all previously displayed task windows are minimized, and the newly selected window is displayed by itself, as the active window. As an alternative, only the last active window is minimized, and any other windows on the display remain in view.

When multiple windows are displayed, the user typically positions them at various locations, so that they may overlap but do not obscure one another. Thus, as illustrated in the example of FIG. 3, some of the windows may be located at the corners of the display, and others in the center of the display. In the single window mode of operation, however, since the user only interacts with one window at a time, it is preferable to position that window at a central location. In an exemplary embodiment of the invention, when the single window mode is enabled, the active window is displayed so that it is horizontally centered within the area of the display. Furthermore, the top of the window can be positioned at a predetermined offset from the top of the display. If the user interface normally displays one or more elements at the top of the screen, such as the menu bar 46, it may be preferable to display the active window at a predetermined offset below these elements. By positioning the active window in this manner, the various windows remain centered on the screen as the user switches between different windows and/or tasks. When the single window mode is disabled, the automatic positioning is no longer in effect and the windows, when restored to their normal sizes, return to their previously stored positions.

Figure 7:
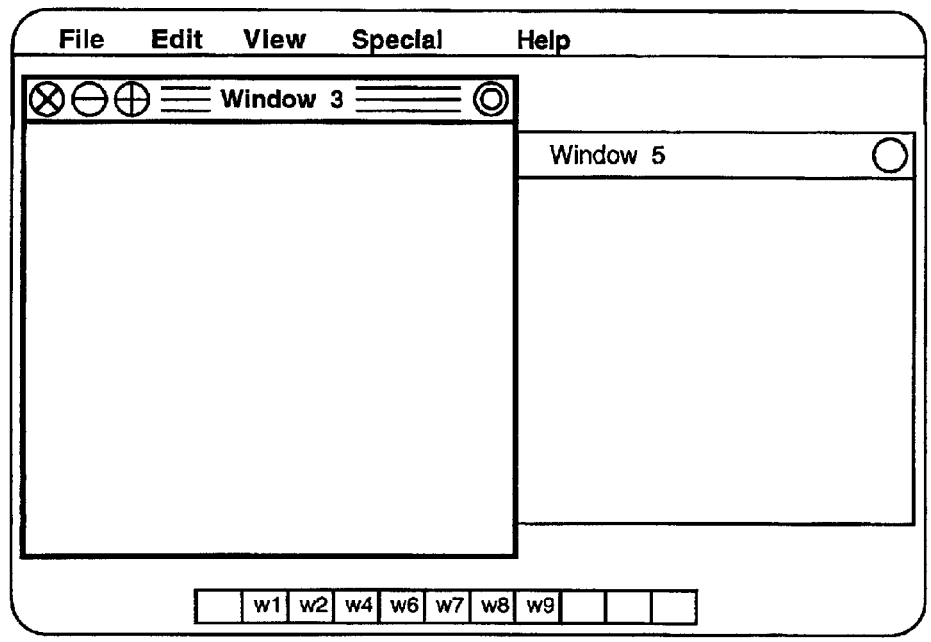
FIG. 7 illustrates an example of repositioned windows.

In some cases, the user may desire to reposition the active window during the single window mode of operation. For example, as described above, the user may desire to display a second window, to exchange content or the like. In this case, it may be preferable to position each of the two displayed windows on respective sides of the screen, so that both can be viewed simultaneously, as illustrated in FIG. 7. If a window is repositioned during a single window mode of operation, the new position is stored as the default position for the window so that, when the single window mode is disabled, the window is displayed at that new position. However, if the repositioned window is minimized and then subsequently restored in the single window mode, it is again displayed at the centered position, rather than the stored default position.

Figure 8:
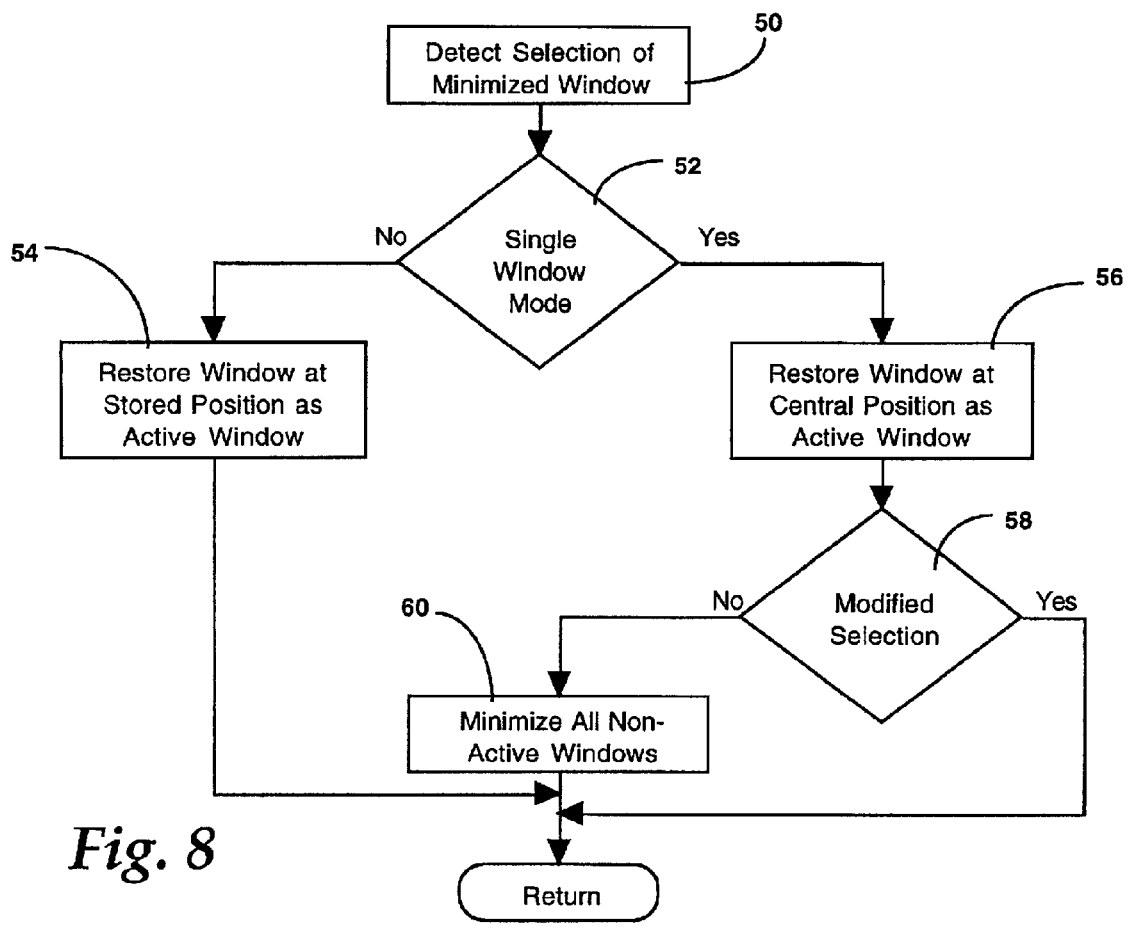
FIG. 8 is a flow chart depicting the operation of the windows manager in the single window mode.

The overall operation of the user interface, when the user selects a minimized window to restore it to its normal size, is depicted in the flow chart of FIG. 8. When the user clicks on a minimized representation of a window, such as a tile in the user bar, this event is conveyed to the window manager 38 at step 50. In response, the window manager checks a flag at step 52, to determine whether the single window mode is enabled. If it is not enabled, the window is restored in its previous position, at step 54, as an active window.

If, however, the single window mode is enabled, the window is restored at the central position as an active window, in step 56. To do so, the window manager 38 subtracts the width of the window from the total width of the display screen, and divides this result by two to determine the appropriate horizontal offset from one side of the screen. The window is then displayed at this horizontal offset and the predetermined vertical offset from the top of the screen, or from the menu bar.

A determination is also made at step 58 whether the selection of the new active window was a modified selection. If not, all non-active task windows are minimized at step 60, so that only the newly-selected window appears on the display. If, however, the selection was modified, step 60 is bypassed, so that all previously displayed windows remain as well. Thereafter, the windows manager returns control to the operating system or the application program, as appropriate.

From the foregoing, therefore, it can be seen that the present invention provides a graphical user interface that permits users to selectively limit the display to a single active task window at any given time, and thereby reduce the clutter and navigational difficulty that may be presented by multiple open windows. As a result, the user is able to more effectively manage the area of the display in a manner which facilitates concentration on the current task. For instance, the user can resize the active window to its maximum size to view more content, without fear of obscuring other windows that are to subsequently accessed.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A user interface for a computer in which data pertaining to multiple different tasks is displayed in multiple different task windows, respectively, and including a user-selectable mode of operation in which only an active one of the multiple task windows is normally displayed at a time, and a minimized representation is provided for all non-active task windows.

2. The user interface of claim 1 wherein said user-selectable mode operates in a manner such that when a user switches from one task to another, the window associated with the former task is replaced by a minimized representation, while the window associated with the new task is displayed to the user.

3. The user interface of claim 2 wherein said user-selectable mode includes an override feature in which the window associated with the former task remains played while the window associated with the new task is being displayed.

4. The user interface of claim 3 wherein the user switches from one task to another by accessing the minimized representation of the window associated with the new task in a predetermined manner, and
  wherein the override feature is activated by accessing the minimized representation of the window in a modified manner.

5. The user interface of claim 1 wherein the minimized representation of a window comprises a thumbnail view of the window.

6. The user interface of claim 1 wherein the minimized representation of a window comprises an icon.

7. The user interface of claim 1 wherein the active window for every task is displayed at a predetermined location while said mode of operation is in effect.

8. The user interface of claim 7 wherein said predetermined location is in the center of a display screen.

9. The user interface of claim 1 further including a control element on each task window for enabling a user to select said mode of operation.

10. The user interface of claim 9 wherein said control element is accessible to select said mode on active task windows and non-active task windows.

11. The user interface of claim 1 further including secondary windows that are associated with functions that relate to tasks, wherein the secondary windows associated with the task of an active window are displayed with the active window during said mode of operation, and secondary windows associated with inactive tasks are not displayed during said mode of operation.

12. The user interface of claim 1 wherein the minimized representation of each non-active window is displayed in a docking area.

13. The user interface of claim 12 wherein said docking area comprises a user bar located along an edge of the display area.

14. A method for displaying data to users in a computer system, comprising the steps of:
  providing a plurality of windows which function as containers for the data of a plurality of different tasks, respectively;
  displaying the window of data for an active one of the tasks and displaying a minimized representation for the window of each inactive task;
  detecting the selection of a task other than the active task;
  replacing the display of the window for the active task with a minimized representation for that window and displaying the window for the selected task, in response to said selection;
  detecting a modified selection of a task other than the active task, and
  overriding the replacement of the window for the active task with a minimized representation, to thereby display the window for a previously active task concurrently with the window for the selected task.

15. The method of claim 14 wherein the minimized representation of a window comprises a thumbnail view of the window.

16. The method of claim 14 wherein the minimized representation of a window comprises an icon.

17. The method of claim 14 wherein the window for every selected task is displayed at the same predetermined location.

18. The method of claim 17 wherein said predetermined location is in the center of a display screen.

19. The method of claim 14 wherein the minimized representation of each non-active window is displayed in a docking area.

20. The method of claim 19 wherein said docking area comprises a user bar located along an edge of a display area.

21. A computer-readable medium containing program code for a user interface which executes the steps of:
  providing a plurality of windows which function as containers for the data of a plurality of different tasks, respectively;
  displaying the window of data for an active one of the tasks and displaying a minimized representation for the window of each inactive task;
  detecting the selection of a task other than the active task;
  replacing the display of the window for the active task with a minimized representation for that window and displaying the window for the selected task, in response to said selection;
  detecting a modified selection of a task other than the active task, and
  overriding the replacement of the window for the active task with a minimized representation, to thereby display the window for a previously active task concurrently with the window for the selected task.

22. The computer-readable medium of claim 21 wherein the minimized representation of a window comprises a thumbnail view of the window.

23. The computer-readable medium of claim 21 wherein the minimized representation of a window comprises an icon.

24. The computer-readable medium of claim 21 wherein the window for every selected task is displayed at the same predetermined location.

25. The computer-readable medium of claim 24 wherein said predetermined location is in the center of a display screen.

26. The computer-readable medium of claim 21 wherein the minimized representation of each non-active window is displayed in a docking area.

27. The computer-readable medium of claim 26 wherein said docking area comprises a user bar located along an edge of a display area.

28. A user interface for a computer system, comprising:
  a control element that is accessed by a user to select a single-window mode of operation; and
  a window manager which controls a display device to display a plurality of windows that function as containers for the data of a plurality of different tasks, respectively, and which is responsive to the selection of the single-window mode of operation to display a minimized representation of each window associated with an inactive task and remove the display of each such window, and which is responsive to the selection of a task other than the active task during the single window mode of operation to replace the display of the window for the active task with a minimized representation for that window and to display the window for the selected task.

29. The user interface of claim 28 wherein said user-selectable mode includes an override feature in which the window associated with the formerly active task remains displayed while the window associated with the selected task is being displayed.

30. The user interface of claim 29 wherein the user switches from one task to another by accessing the minimized representation of the window associated with a new task in a predetermined manner, and the override feature is activated by accessing the minimized representation of the window in a modified manner.

31. The user interface of claim 28 wherein the minimized representation of a window comprises a thumbnail view of the window.

32. The user interface of claim 28 wherein the minimized representation of a window comprises an icon.

33. The user interface of claim 28 wherein the active window for every task is displayed at a predetermined location while said mode of operation is in effect.

34. The user interface of claim 33 wherein said predetermined location is in the center of a display screen.

35. The user interface of claim 28 wherein said control element is located on each task window.

36. The user interface of claim 35 wherein said control element is accessible to select said mode on active task windows and non-active task windows.

37. The user interface of claim 28 wherein secondary windows associated with the task of an active window are displayed with the active window during said mode of operation, and secondary windows associated with inactive tasks are not displayed during said mode of operation.

38. The user interface of claim 28 wherein the minimized representation of each non-active window is displayed in a docking area.

39. The user interface of claim 38 wherein said docking area comprises a user bar located along an edge of the display area.

* * * * *